(12) United States Patent
Heath et al.

(10) Patent No.: US 11,449,003 B2
(45) Date of Patent: Sep. 20, 2022

(54) POSITION ADJUSTMENT IN HOLOGRAPHIC SIGHT

(71) Applicant: EOTECH, LLC, Ann Arbor, MI (US)

(72) Inventors: Anthony Heath, Ypsilanti, MI (US); Steve Freis, Ann Arbor, MI (US)

(73) Assignee: EOTech, LLC, Plymouth, MI (US)

( * ) Notice: Subject to any disclaimer, the term of this patent is extended or adjusted under 35 U.S.C. 154(b) by 475 days.

(21) Appl. No.: 16/691,291

(22) Filed: Nov. 21, 2019

(65) Prior Publication Data
US 2021/0157267 A1 May 27, 2021

(51) Int. Cl.
*F41G 1/30* (2006.01)
*G03H 1/22* (2006.01)
*G02B 5/32* (2006.01)

(52) U.S. Cl.
CPC .............. *G03H 1/2205* (2013.01); *F41G 1/30* (2013.01); *G02B 5/32* (2013.01)

(58) Field of Classification Search
CPC .......... F41G 1/30; F41G 11/003; F41G 1/345; F41G 1/35; F41G 1/16; F41G 1/38; G02B 5/32; G02B 23/10; G02B 23/105; G02B 27/34; G03H 2001/2284; G03H 1/2205
USPC .............. 42/113, 111, 114, 119, 123; 359/15
See application file for complete search history.

(56) References Cited

U.S. PATENT DOCUMENTS

| | | |
|---|---|---|
| 3,994,597 A | 11/1976 | Calder et al. |
| 4,191,471 A | 3/1980 | Courten |
| 4,592,654 A | 6/1986 | Girault |
| 4,940,324 A | 7/1990 | Nichols |
| 5,090,805 A | 2/1992 | Stawarz |
| 5,134,798 A | 8/1992 | Lee |
| 5,369,888 A | 12/1994 | Kay |
| 5,383,278 A | 1/1995 | Kay |
| 5,483,362 A | 1/1996 | Tai et al. |
| 5,508,843 A | 4/1996 | Tomita |

(Continued)

FOREIGN PATENT DOCUMENTS

| | | |
|---|---|---|
| EP | 2943736 B1 | 10/2017 |
| ES | 2672007 T3 | 6/2018 |

(Continued)

OTHER PUBLICATIONS

International Search Report for Application No. PCT/US2020/060714 dated Jun. 21, 2021; 2 pp.

(Continued)

*Primary Examiner* — Michael D David
(74) *Attorney, Agent, or Firm* — Bodman PLC

(57) ABSTRACT

A holographic sight comprises a base, a support member attached to the base and extending upward therefrom, and a unitary optical component carrier formed with the support member. The support member is flexible and the unitary optical component carrier moveable in horizontal and vertical directions relative to the base. A bridge is attached to the base and forms an opening into which a portion of the unitary optical component carrier extends. A projection is coupled with the bridge and protrudes into the opening to abut the unitary optical component carrier. Extending the projection into the opening increases pressure applied by the projection to the optical component carrier. The increased pressure causes the unitary optical component carrier to be displaced.

20 Claims, 13 Drawing Sheets

(56) References Cited

U.S. PATENT DOCUMENTS

| | | | |
|---|---|---|---|
| 6,000,667 A | 12/1999 | Isbell et al. | |
| 6,490,060 B1 | 12/2002 | Tai et al. | |
| 7,145,703 B2 | 12/2006 | Sieczka et al. | |
| 7,225,578 B2 | 6/2007 | Tai | |
| 7,784,192 B2 | 8/2010 | Jancic et al. | |
| 7,872,747 B2 | 1/2011 | Gerlach | |
| 8,056,245 B2 | 11/2011 | Cranton et al. | |
| 8,087,196 B2 | 1/2012 | Jung et al. | |
| 8,156,679 B1 | 4/2012 | Swan | |
| 8,186,093 B1 | 5/2012 | Chung | |
| 8,240,075 B1 | 8/2012 | Mullin | |
| 8,296,991 B1 | 10/2012 | Chung | |
| 8,671,611 B2 | 3/2014 | Ostergren et al. | |
| 9,057,584 B2 | 6/2015 | Chung | |
| 9,500,442 B2 | 11/2016 | Collin et al. | |
| 10,095,089 B2 | 10/2018 | Po et al. | |
| 10,247,515 B2 | 4/2019 | Collin | |
| 10,254,532 B2 | 4/2019 | Collin | |
| 10,267,597 B2 | 4/2019 | Olmstead et al. | |
| 10,345,077 B1 | 7/2019 | Loebig et al. | |
| 10,345,587 B1 | 7/2019 | Loebig et al. | |
| 10,401,124 B1* | 9/2019 | Bartoszewicz | F41G 11/003 |
| 10,591,249 B2 | 3/2020 | Campbell | |
| 10,634,453 B1* | 4/2020 | Spuhr | F41G 11/003 |
| 10,704,862 B2 | 7/2020 | Chung | |
| 10,801,813 B2 | 10/2020 | Moseman et al. | |
| 11,098,980 B2* | 8/2021 | Heath | F41G 11/001 |
| 2003/0074824 A1 | 4/2003 | Arachequesne | |
| 2006/0265930 A1 | 11/2006 | Woodbury | |
| 2008/0020355 A1 | 1/2008 | Young | |
| 2008/0216379 A1 | 9/2008 | Javorsky | |
| 2009/0116231 A1 | 5/2009 | Miller | |
| 2009/0193705 A1 | 8/2009 | LoRocco | |
| 2010/0162611 A1 | 7/2010 | Samson et al. | |
| 2011/0228366 A1 | 9/2011 | Liu | |
| 2013/0008072 A1 | 1/2013 | Chung | |
| 2014/0237884 A1 | 8/2014 | Koesler | |
| 2014/0305022 A1 | 10/2014 | Chung | |
| 2014/0317988 A1 | 10/2014 | Battis et al. | |
| 2015/0198415 A1 | 7/2015 | Campean | |
| 2015/0267997 A1 | 9/2015 | Collin et al. | |
| 2016/0003996 A1 | 1/2016 | Dehmlow et al. | |
| 2016/0033232 A1 | 2/2016 | Cheng | |
| 2016/0102943 A1 | 4/2016 | Teetzel et al. | |
| 2016/0161735 A1 | 6/2016 | Ambruster | |
| 2016/0245618 A1* | 8/2016 | Collin | G02B 23/2446 |
| 2016/0313089 A1 | 10/2016 | Collin et al. | |
| 2016/0327365 A1 | 11/2016 | Collin et al. | |
| 2016/0377377 A1 | 12/2016 | Collin | |
| 2016/0377378 A1 | 12/2016 | Collin | |
| 2017/0205194 A1 | 7/2017 | Teetzel et al. | |
| 2018/0292168 A1 | 10/2018 | Borrico | |
| 2019/0072702 A1 | 3/2019 | Voloschenko et al. | |
| 2019/0145733 A1 | 5/2019 | Chung | |
| 2019/0277600 A1 | 9/2019 | Larsson | |
| 2019/0346235 A1 | 11/2019 | Sidelkovsky | |
| 2020/0011640 A1 | 1/2020 | Moseman et al. | |
| 2020/0025522 A1* | 1/2020 | Zimmer | F41G 11/001 |
| 2020/0141700 A1 | 5/2020 | Moseman et al. | |
| 2020/0240748 A1 | 7/2020 | Connolly | |
| 2020/0272044 A1 | 8/2020 | Walker | |
| 2021/0156645 A1 | 5/2021 | Heath | |
| 2021/0156646 A1 | 5/2021 | Schulte et al. | |
| 2021/0157086 A1 | 5/2021 | Heath et al. | |
| 2021/0157119 A1 | 5/2021 | Heath et al. | |
| 2022/0065583 A1 | 3/2022 | Heath et al. | |
| 2022/0065584 A1* | 3/2022 | Ding | F41G 1/44 |

FOREIGN PATENT DOCUMENTS

| | | |
|---|---|---|
| JP | 4019995 B2 | 12/2007 |
| JP | 2008090257 A | 4/2008 |
| KR | 101375457 B1 | 3/2014 |
| RU | 2582900 C1 | 4/2016 |
| WO | WO1995031740 | 11/1995 |
| WO | 2019068165 A1 | 4/2019 |
| WO | 2020250758 A1 | 12/2020 |
| WO | 2021141669 A1 | 7/2021 |
| WO | 2021141670 A2 | 7/2021 |
| WO | 2021141671 A1 | 7/2021 |

OTHER PUBLICATIONS

International Search Report for Application No. PCT/US2020/060719 dated Aug. 20, 2021; 2 pp.

International Search Report for Application No. PCT/US2020/060695 dated May 21, 2021; 2 pp.

International Search Report for Application No. PCT/US2020/060707 dated Sep. 24, 2021; 2 pp.

* cited by examiner

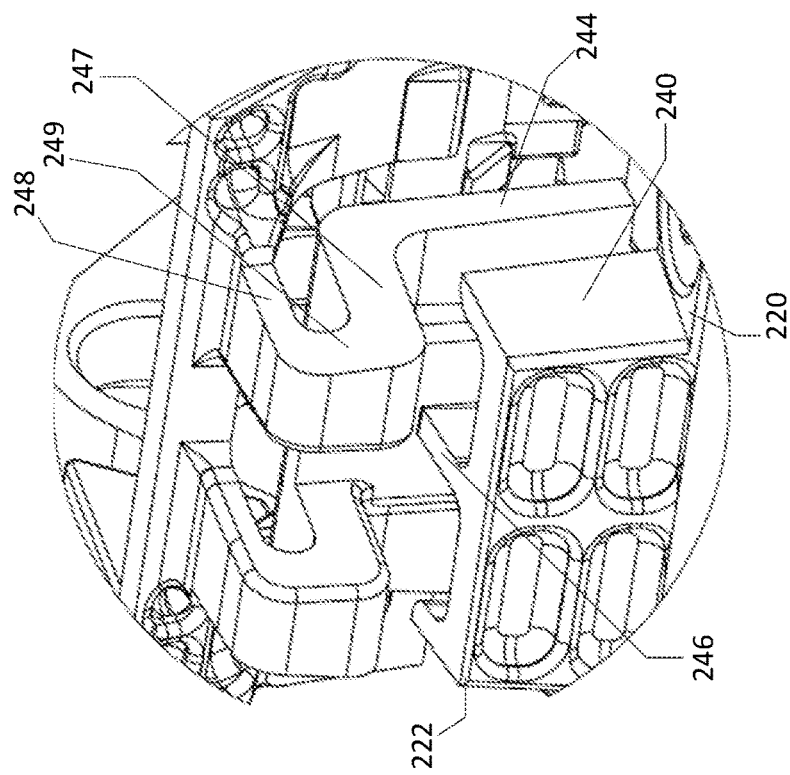
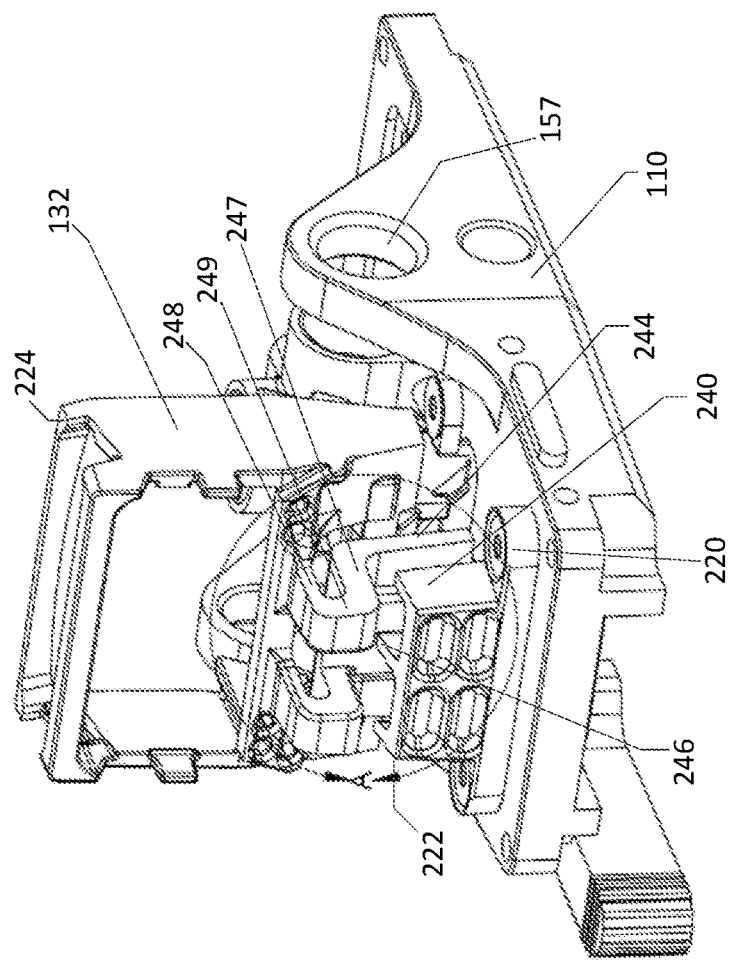
FIG. 4B
FIG. 4A

POSITION ADJUSTMENT IN HOLOGRAPHIC SIGHT

BACKGROUND

Identifying and focusing on an object located at a distance may be facilitated by use of a sight. A sight may be employed, for example, with small arms such as bows, rifles, shotguns, handguns, mounted machine guns, and grenade launchers, etc., and may assist an operator to locate and maintain focus on a target.

Sights have been developed in many different forms and utilizing various features. For example, sights have been developed that present the operator with a hologram which may assist the operator with locating and focusing on an object.

SUMMARY

Disclosed herein is an adjustable holographic sight. The holographic sight may comprise a base, a support member attached to the base, and a unitary optical component carrier integrally formed with the support member. The support member may be flexible and the unitary optical component carrier angularly moveable in horizontal and vertical directions relative to the base. The holographic sight may further comprise a bridge attached to the base and forming an opening with the base. A portion of the unitary optical component carrier may extend within the opening. A first projection may be coupled with the bridge and protrude from the bridge into the opening. The first projection may abut the portion of the unitary optical component carrier and may be mechanically coupled with a first head that is configured to be rotated. A second projection may be coupled with the bridge and protrude from the bridge into the opening. The second projection may abut the portion of the unitary optical component carrier and may be mechanically coupled with a second head that is configured to be rotated. Rotation of the first head causes the first projection to extend further into the opening and increase pressure applied by the first projection to the portion of the optical component carrier extending within the opening. The increased pressure may cause the unitary optical component carrier to be angularly displaced vertically. Rotation of the second head causes the second projection to extend further into the opening and increase pressure applied by the second projection to the portion of the optical component carrier extending within the opening. The increased pressure may cause the unitary optical component carrier to be angularly displaced horizontally.

The portion of the unitary optical component carrier that extends into the opening formed by the bridge may comprise a first set of opposing walls and a second pair of opposing walls. At least one of the first pair of walls may comprise a substantially even surface. The first projection may comprise a first rounded end that abuts the substantially even surface of the one of the first pair of walls. At least one of the second pair of walls may comprise a substantially even surface. The second projection may comprise a second rounded end that abuts the substantially even surface of the one of the second pair of walls. The rounded ends of the projections on the substantially even surfaces of the side walls allow the portion of the unitary optical component to move freely in directions perpendicular to the projections. The projections may slide on the surfaces of the side walls to accommodate expansion and contraction of the optical component carrier.

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter. Other features are described herein.

BRIEF DESCRIPTION OF THE DRAWINGS

The foregoing summary and the following additional description of the illustrative embodiments may be better understood when read in conjunction with the accompanying exemplary drawings. It is understood that the potential embodiments of the disclosed systems and implementations are not limited to those depicted. Furthermore, like reference numerals in the figures indicate like elements.

FIG. 4A is a perspective view of an example optical chassis attached to an example base.

FIG. 4B is a detailed view of a portion of the optical chassis.

DETAILED DESCRIPTION

Figure 1A:
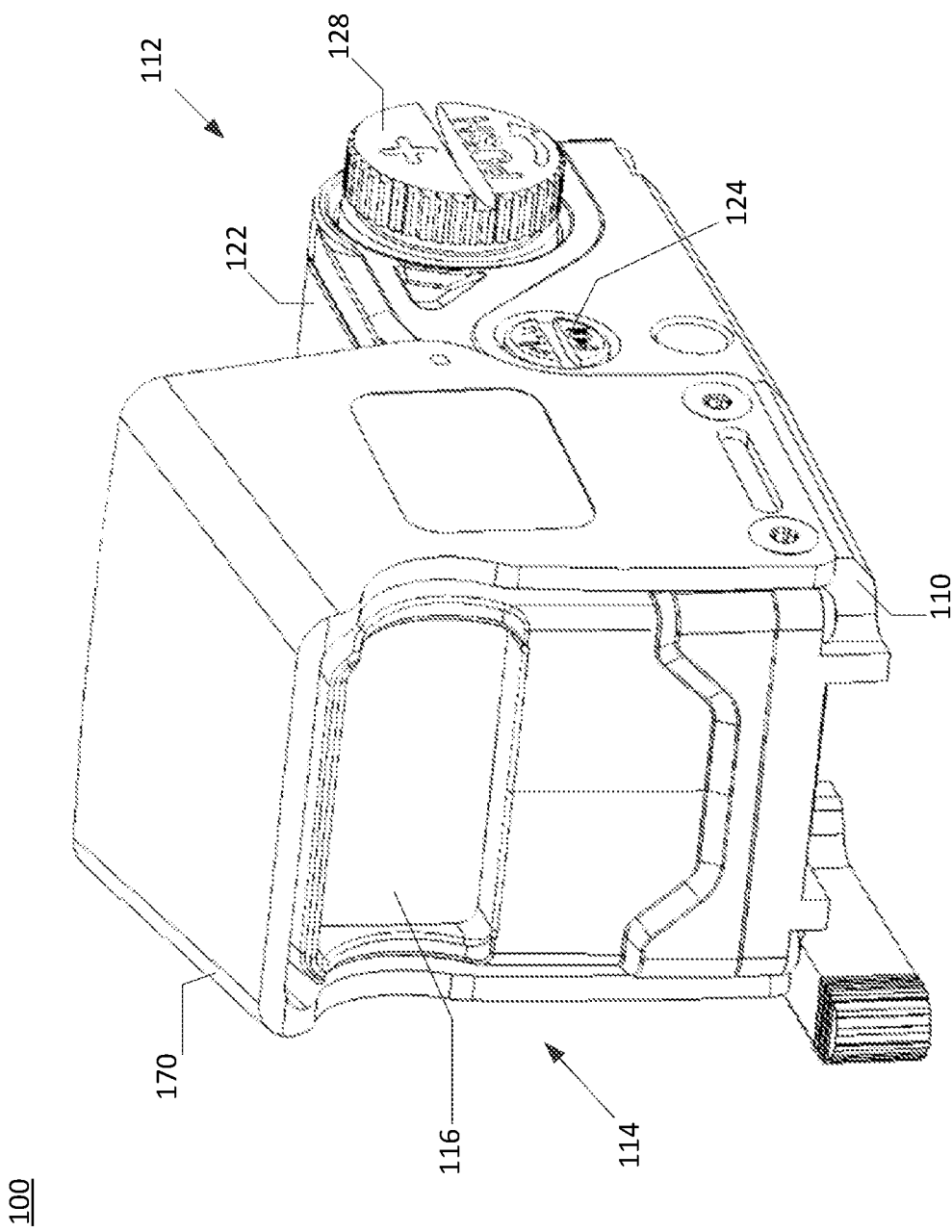
FIGS. 1A, 1B, 1C, and 1D depict perspective views of an example assembled holographic sight.

Holographic sights may employ a series of optical components to generate a hologram for presentation to the operator. For example, a holographic sight may employ a laser diode that generates a light beam, a mirror that deflects the light beam, a collimating optic that receives the deflected light beam and reflects collimated light, a grating that receives the collimated light and reflects light toward an image hologram that has been recorded with an image and which displays the image to the operator of the sight. Operation of the holographic sight requires that the optical components be in the intended positions including distance and orientation relative to each other. Even very small variances from the intended position of even one of the optical components may negatively impact the operation of the sight.

Holographic sights may position optical components relative to each other by affixing them to structures in a holographic sight. For example, optical components such as, for example, the collimating optic and the hologram image may be affixed to an interior of a holographic sight housing. The mirror may be positioned on a podium extending from a mount to which the sight housing is attached. The grating may be affixed to a moveable plate configured to rotate relative to the sight housing. Because the optical components are attached to different components which themselves may be moveable relative to each other, it may be difficult to place the optical components in their intended positions even in a controlled manufacturing environment. Furthermore, movement of any of the structures to which the optical components are attached may move the optical components from their intended positions causing the hologram to be degraded.

A sight for use with an armament may be adjusted to compensate for the deviation of a projectile from the intended point of impact. An azimuth adjustment control may be configured to compensate for the horizontal deviation of a projectile trajectory from the intended point of impact. With respect to a holographic sight, an azimuth adjustment control may be configured to compensate for the horizontal deviation of a projectile from the location targeted by the hologram created by the sight. An elevation adjustment control may be configured to compensate for the vertical deviation of a projectile from the intended point of impact. In a holographic sight, an elevation adjustment control may be configured to compensate for the vertical deviation of a projectile from the location targeted by the hologram created by the sight. In an example, azimuth and elevation adjustment controls may apply forces to the structures of the sight, causing the optical components to be displaced from their intended positions, and result in degradation of the hologram. In an example scenario, the elevation and/or azimuth adjustment controls may apply pressure to an optical component such as, for example, the grating, to alter the optical path. But placing pressure on an optical component may operate to displace the optical component from its intended position relative to other optical components and result in the degradation of the hologram generated by the sight. In an example, the elevation and/or azimuth adjustment control may interface with an external housing. Changes in the structure of the housing such as, for example, the housing expanding or contracting in response to changes in temperature may displace the elevation and/or azimuth adjustment controls which may apply pressure to and displace the optical components.

Applicant discloses herein a holographic sight comprising individual optical components that are substantially decoupled or independent from unintended forces. The holographic sight may comprise a base, a unitary optical component carrier having a plurality of optical components received in receptacles, and a bridge that forms an opening with the base. A portion of the unitary optical component carrier is positioned in the opening. A first projection may extend from the bridge, into the opening, and abut a first surface of the portion of the unitary optical component carrier. The first projection may be mechanically coupled to a first head and may respond to rotation of the first head by extending further into the opening and applying additional pressure to the portion of the optical component carrier. The optical component carrier may be displaced angularly in a vertical direction in response to the pressure and thereby provide vertical adjustment to the holographic sight. A second projection may extend from the bridge, into the opening, and abut a second surface of the portion of the unitary optical component carrier. The second projection may be mechanically coupled to a second head and may respond to rotation of the second head by extending further into the opening and applying additional pressure to the portion of the optical component carrier. The optical component carrier may be angularly displaced in a horizontal direction in response to the pressure and thereby provide azimuth adjustment to the holographic sight. The first surface and the second surface of the portion of the unitary optical component carrier may be substantially flat or even. The first projection may slide on the first surface and the second projection may slide on the second surface and may, therefore, accommodate movement of the optical component carriers in a direction perpendicular to the projections. The individual optical components are mechanically isolated from direct pressures from the azimuth and elevation controls and the optical component carrier is mechanically decoupled from the azimuth and elevation controls in at least one dimension. The optical component carrier is decoupled from unintended pressures originating from other components in the sight such as, for example, the housing and base.

Figure 1B:
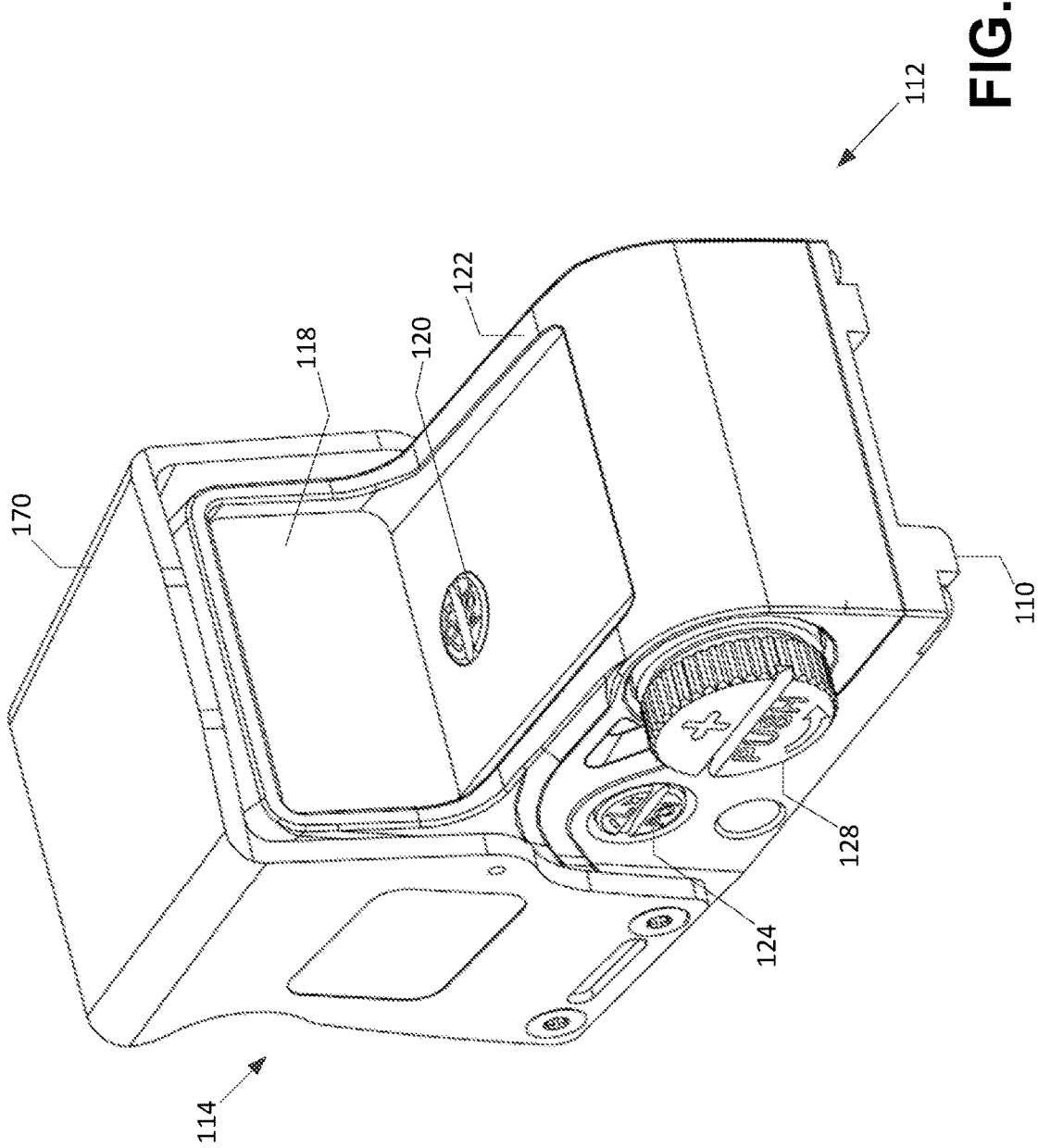
Figure 1C:
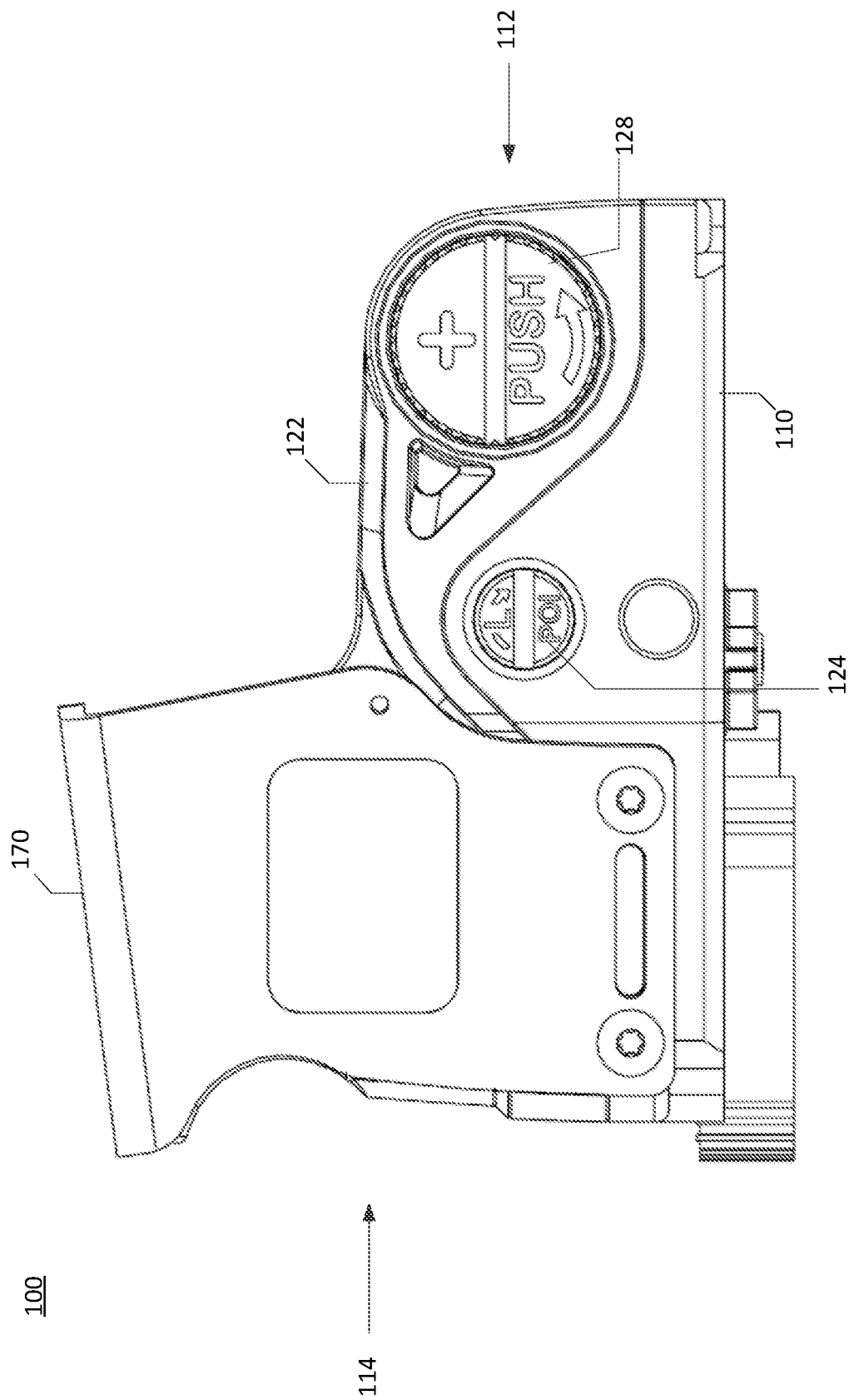
Figure 1D:
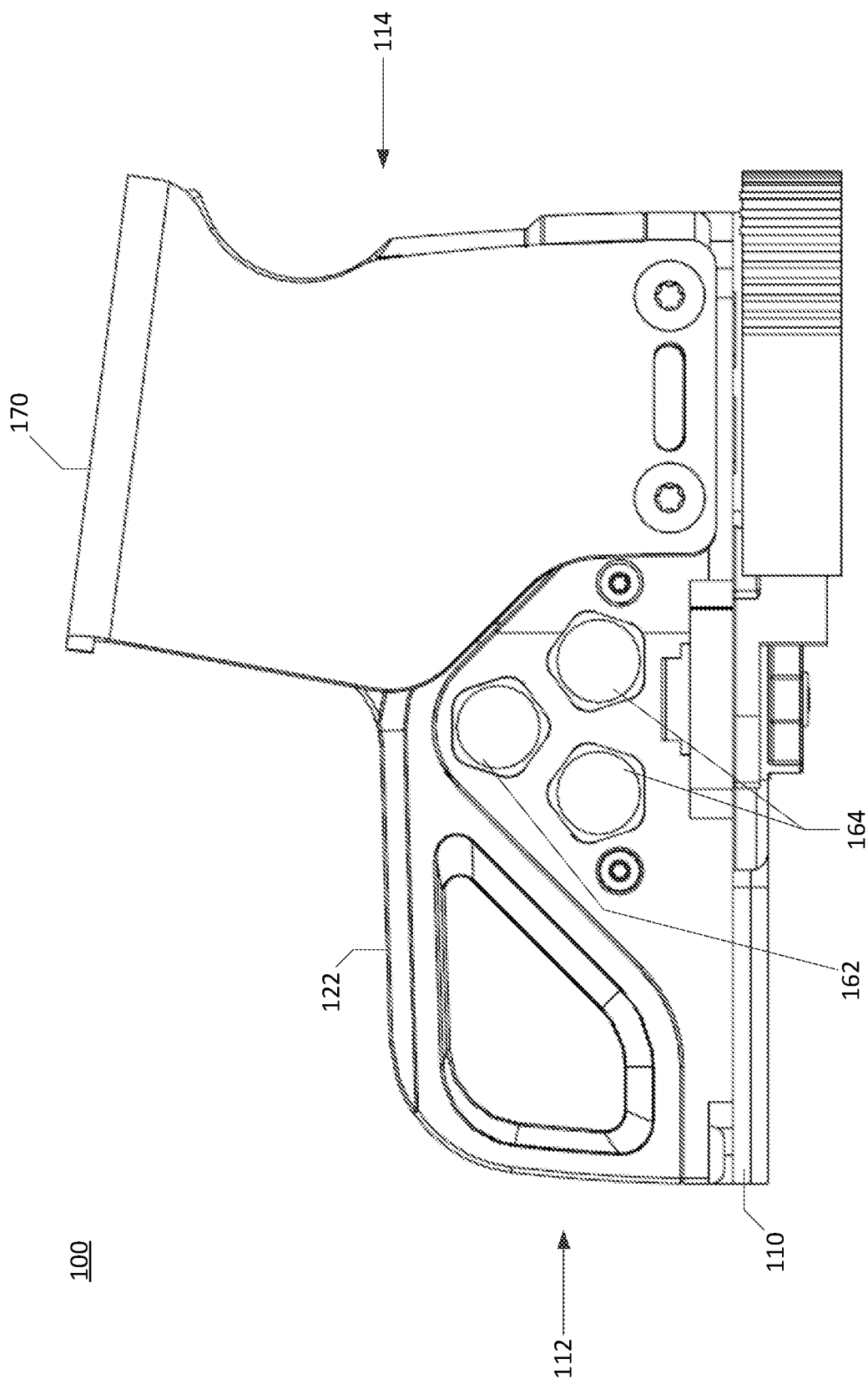

FIGS. 1A and 1B depict front and rear views, respectively, of an example holographic sight 100. FIGS. 1C and 1D depict side views of the example holographic sight 100. The holographic sight 100 may be adapted to be removably attached to a suitable device such as, for example, a firearm. The holographic sight 100 may comprise a base 110 that is configured to releasably engage with corresponding components on a firearm in order to secure the holographic sight 100 to the firearm.

The holographic sight 100 comprises a front end 112 and a rear end 114. An operator of the holographic sight 100 may look through a back window 116 situated at the rear end 114 and an aligned front window 118 situated at the front end 112. The area visible to the operator through the back window 116 and the aligned front window 118 may be referred to as a viewing area. The holographic sight 100 is adapted to impose a holographic image in the viewing area defined by the back window 116 and the front window 118.

An elevation adjustment control 120 may be accessible via an opening formed in a housing 122 of the holographic sight 100. An azimuth adjustment control 124 may be accessible via an opening formed in the base 110. An operator may turn the elevation adjustment control 120 to adjust the vertical location of the hologram as viewed from the back window 116. An operator may turn the azimuth adjustment control 124 to adjust the horizontal location of the hologram as viewed from the back window 116. A battery cap 128 may be removed to provide access to an opening configured to receive a battery which may provide electrical power to the holographic sight 100.

A night vision button 162 and up-down buttons 164 may extend through apertures formed in the base 110. An operator of the holographic sight may depress the night vision button 162 and/or the up/down buttons 164 to change the operating characteristics of the holographic sight 100. For example, depressing a particular button or combination of buttons may cause the holographic sight 100 to change its on/off state, change the brightness of the hologram, and/or toggle between normal and night vision modes The holographic sight 100 may further comprise a hood 170. The hood 170 may be positioned over and around a portion of the housing 122 and may be mechanically attached to the base 110. The hood 170 may be configured to protect the housing 122 from impacts.

Figure 2:
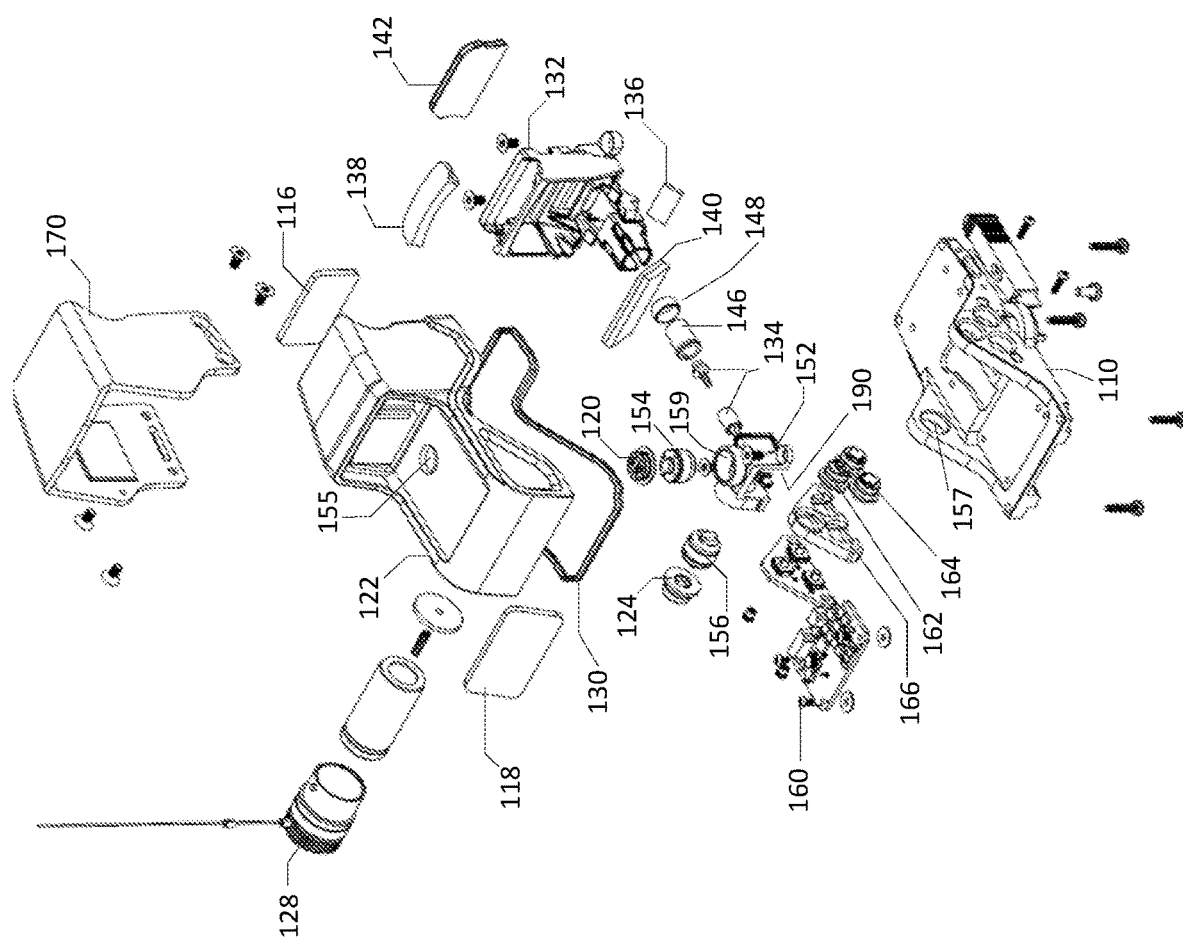
FIG. 2 is an exploded view of an example holographic sight.

FIG. 2 provides an exploded view of the holographic sight 100. The housing 122 may be mechanically coupled to the base 110 and may have a seal 130 positioned therebetween. The housing 122 envelopes components of the holographic sight 100. For example, the housing 122 may envelop an optical chassis 132 which may also be mechanically coupled to the base 110. The optical chassis 132 may comprise a rigid body with a plurality of receptacles for receiving optical components employed to create a holographic image. For example, the optical chassis 132 may comprise a body with receptacles for receiving each of a laser diode 134, a mirror 136, a collimating optic 138, a grating 140, and an image hologram 142. The laser diode 134 may be configured to generate visible light which is directed toward and received at the mirror 136. The mirror 136 may be configured to reflect light received from the laser diode 134 toward the collimating optic 138. The collimating optic 138 may be configured to receive reflected light from the mirror 136 and to direct collimated light to the grating 140. The collimating optic 138 may be, for example, transmissive or reflective. The grating 140, which may be, for example, a diffraction grating, may be configured to receive the collimated light from the collimating optic 138 and to reflect diffracted light toward the image hologram 142. The image hologram 142 may be configured to receive light from the grating 140 and project a hologram image which may be viewed in the viewing area of the holographic sight 100. The holographic sight 100 displays the hologram to the operator who looks through the viewing area presented by the rear window 116. The hologram image may be configured to assist an operator in locating and targeting an object. For example, the hologram may be a reticle, although other images may be employed.

A collar 146, which may be referred to as a laser diode shoe, may be formed in a cylindrical shape with an interior surface having an associated interior diameter and an exterior surface having an associated exterior diameter. The laser diode 134 may be positioned within the collar 146 and form a frictional fit with the interior surface of the collar 146. A diode ring 148 may be positioned around the exterior surface of the collar 146 and form a frictional fit with the exterior surface of the collar 146. The ring 148 is received within a corresponding receptacle of the optical chassis 132. The ring may form a frictional fit with opposing walls comprised in the corresponding receptacle of the optical chassis 132. A laser diode hold press may be used to apply pressure to the collar 146 during insertion of the laser diode 134, the collar 146, and the ring 148 into the corresponding receptacle of the optical chassis 132.

The housing 132 further envelopes a bridge 152 which may be mechanically coupled to the base 110. The bridge 152 may form an opening 190 into which at least a portion of the first receptacle of the optical chassis 132 extends. An elevation adjuster assembly 154 and an azimuth adjuster assembly 156 may extend through openings 159 formed in the bridge 152 to engage portions of the first receptacle of the optical chassis 132. The elevation adjustment control 120 may engage with the elevation adjuster assembly 154 via an opening or aperture 155 formed in the housing 122. The opening or aperture 155 in the housing 122 may be formed to allow the elevation adjustment control 120 to engage with elevation adjuster assembly 154 without interference by the housing 122. For example, the opening 155 may be sufficiently large that it does not abut or interfere with the elevation adjustment control 120. Accordingly, movement or expansion of the housing 122 may not exert pressure on elevation adjustment control 120. The amount of force or pressure applied by the elevation adjustment control 120 may be decoupled from expansion and/or movement of the housing 122. An operator of the holographic sight 100 may turn the elevation adjustment control 120, which causes the elevation adjuster assembly 154 to increase or decrease the length of the assembly extending into the opening 190 formed by the bridge 152 and thereby increase or decrease a force applied to the first receptacle of the optical chassis 132.

The azimuth adjustment control 124 engages with the azimuth adjuster assembly 156 via an opening 157 formed in the base 110. The opening 157 in the base 110 may be formed to allow the azimuth adjustment control 124 to engage with azimuth adjuster assembly 156 without interference by the base 110. For example, the opening 157 may be sufficiently large that it does not abut or interfere with adjustment control 124. Accordingly, movement or expansion of the base 110 may not exert pressure on adjustment control 124. The amount of force or pressure applied by the adjustment control 124 may be decoupled from expansion and/or movement of the base 110. An operator of the holographic sight 100 may turn the azimuth adjustment control 124, which causes the azimuth adjuster assembly 156 to increase or decrease the length of the assembly extending into the opening 190 formed by the bridge 152 and thereby increase or decrease a force applied to the first receptacle of the optical chassis 132.

The housing 122 may further envelop a printed circuit board assembly 160 comprising electronics configured to power and control the holographic sight 100. A night vision button 162 and up-down buttons 164 may extend through a spacer 166 to engage the printed circuit board assembly 160. The night vision button 162 and the up-down buttons 164 may extend through corresponding openings in the base 110. When an operator of the holographic 100 sight depresses the night vision button 162 and/or the up/down buttons 164, the buttons may interface with the printed circuit board assembly 160 to change the operating characteristics of the holographic sight 100. For example, depressing a particular button or combination of buttons may cause the printed circuit board assembly 160 to change the on/off state, change the brightness of the hologram, and/or toggle between normal and night vision modes.

Figure 3:
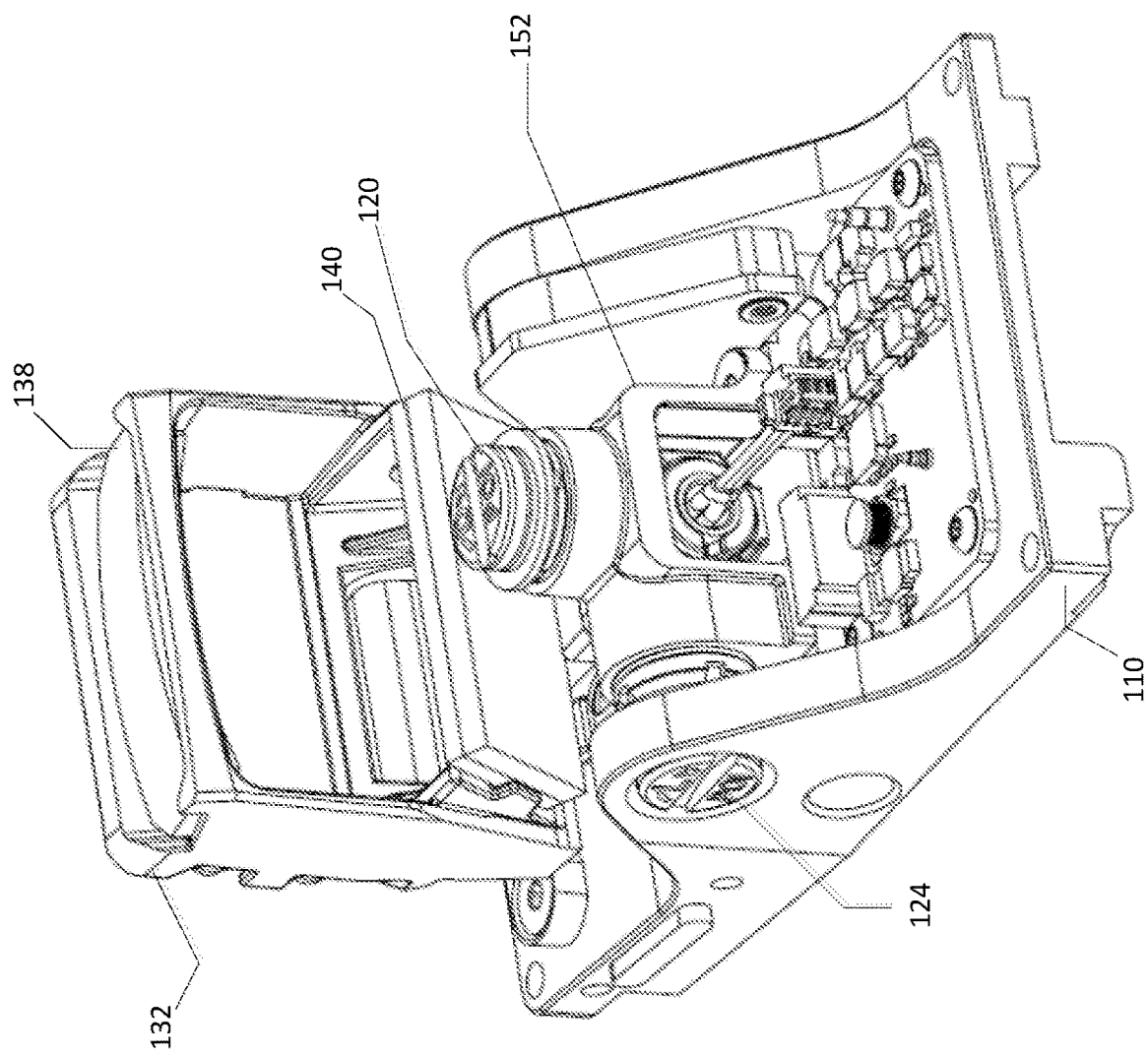
FIG. 3 is a perspective view of an example partially assembled holographic sight.

FIG. 3 depicts a perspective view of the example holographic sight 100 partially assembled with the housing 122, hood 170, and other elements removed. The optical chassis 132 may be mechanically coupled to the base 110 using a suitable fastening technique such as, for example, using screws. The optical components comprising the laser diode 134, the mirror 136, the collimating optic 138, the grating 140, and the image hologram 142 may be received in receptacles of the optical chassis 132. The bridge 152 may be mechanically coupled to the base 110 using a suitable fastening technique such as, for example, using screws. A portion of the optical chassis 132 may extend into an opening 190 defined by the bridge and the base 110. The elevation adjustment control 120 may interface with the elevation adjuster assembly 154 to apply force to a portion of the optical chassis 132 and thereby adjust the elevation of the optical chassis 132. The azimuth adjustment control 124 may interface with the azimuth adjuster assembly 156 to apply force to a portion of the optical chassis 132 and thereby adjust the angular horizontal orientation of the optical chassis 132 relative to the base 110.

Figure 5:
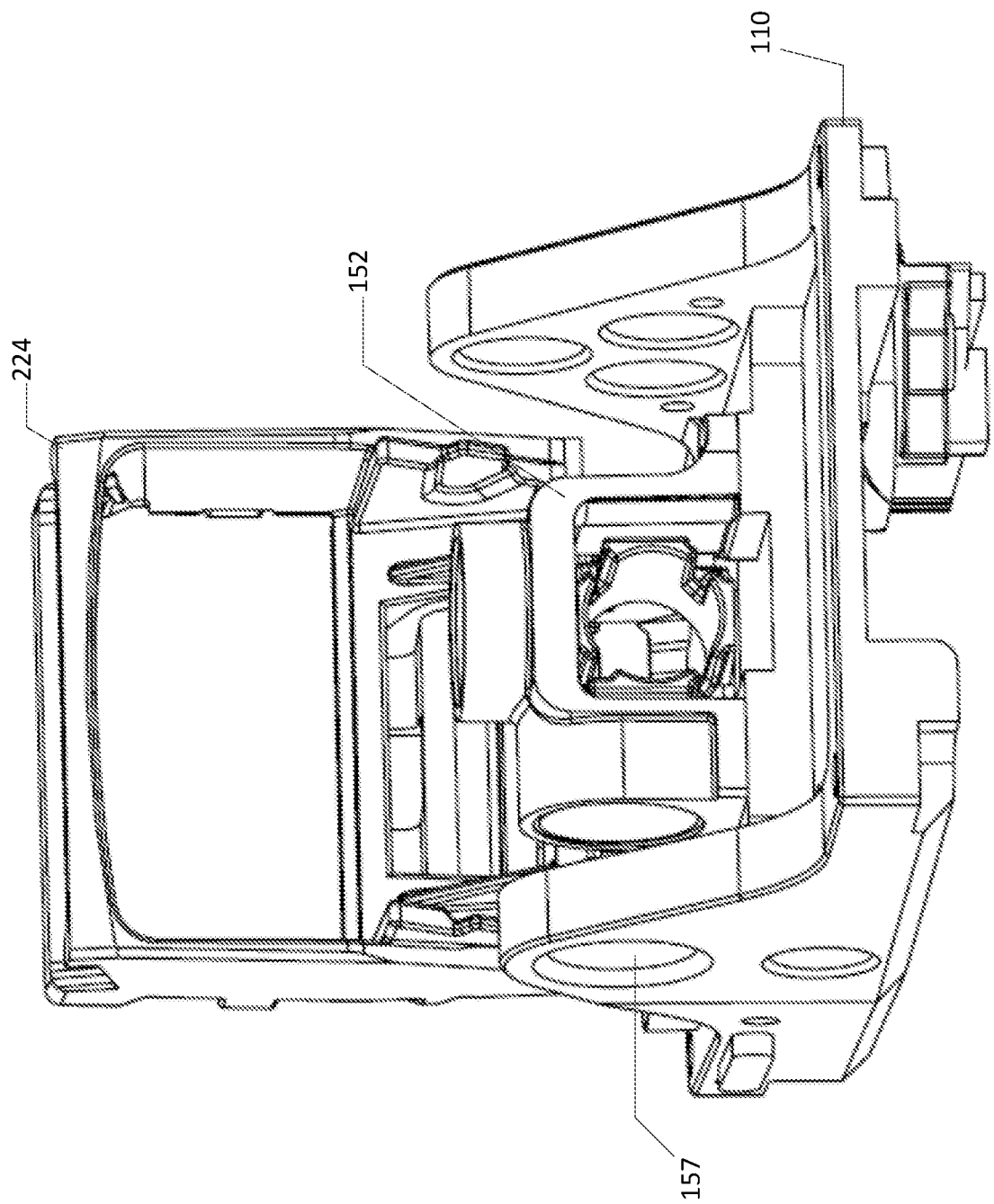
FIG. 5 is a perspective view of an example optical chassis attached to an example base.

FIG. 4A depicts an isolated perspective view of an example optical chassis 132 attached to the base 110 and with the optical components removed. FIG. 4B depicts an enlarged view of a portion of the example optical chassis 132. FIG. 5 depicts a reverse perspective view of the optical chassis 132 attached to the base 110. The optical chassis 132 may comprise an attachment flange 220, a support member 222 integrally formed with the attachment flange 220 and extending upward from the attachment flange 220, and a unitary optical component carrier 224 integrally formed with the support member 222. The attachment flange 220 may be secured to the base 110 using a suitable manner which may comprise, for example, screws that extend through openings in the attachment flange 220 and into corresponding receptacles in the base 110. The support member 222 and the unitary optical component carrier 224 may be suspended relative to the base 110 by the attachment flange 220.

The support member 222 of the optical chassis 132 may comprise one or more portions that are flexible such that the unitary optical component carrier 224 may be angularly moveable in horizontal and/or vertical directions relative to the attachment flange 220 and the base 110. The support member 222 may be compliant so as to allow for adjustment of the position of the unitary optical component carrier 224 relative to the attachment flange 220 and base 110 and thereby allow for adjusting the location of the hologram created in the operator's field of view.

The support member 222 may comprise a first wall 240 extending upward relative to the attachment flange 220 and integrally formed with the attachment flange 220. The support member 222 may further comprise a second wall 244 and a flexible member 246 coupled between the first wall 240 and the second wall 244. The second wall 244 and the flexible member 246 may be supported by the first wall 240. The second wall 244 may be free to move angularly in a horizontally direction, with the flexible member 246 as a fulcrum, relative to the attachment flange 220 and base 110. The flexible member 246 may be coupled to the first wall 240 near the center of the first wall 240 and may be coupled to the second wall 244 near the center of the second wall 244. When a horizontal force is applied to the second wall 244, the flexible member 246 may be flexed or twisted allowing the second wall 244 to move or be angularly displaced horizontally relative to the first wall 240 with the flexible member 246 being a fulcrum of the movement. Horizontal force applied to the optical component carrier 224 may be communicated to the second horizontal wall 244 and may result in angular horizontal movement around or about the flexible member 246 of the second wall 244 and the optical component carrier 224 relative to the first wall 240 and the attachment flange 220.

The support member 222 may further comprise a first horizontal member 247 integrally formed with the second wall 244 and extending away from the unitary optical component carrier 224, a second horizontal member 248 extending toward the unitary optical component carrier 224, and a joint member 249 integrally formed with the first horizontal member 247 and the second horizontal member 248. The first horizontal member 247, the joint member 249, and the second horizontal member 248 may be integrally formed and together provide vertical flexibility to the unitary optical component carrier 224 relative to the attachment flange 220 and the base 110. The second horizontal member 248 may be flexible in a vertical direction relative to the first horizontal member 247. The joint member 249 may be flexible and allow for vertical movement of the second horizontal member 248 relative to the first horizontal member 247. When vertical pressure is applied to the second horizontal member 248, it may move or be displaced in a vertical direction relative to the first horizontal member 247, the attachment flange 220, and the base 110. The movement may be angular with the joint member 249 serving as a fulcrum. Vertical force applied to the unitary optical component carrier 224 may be communicated to the second horizontal member 248 and result in vertical angular movement around or about the joint member 249 of the unitary optical component carrier 224 and the second horizontal member 248 relative to the first horizontal member 247 and the attachment flange 220. As illustrated in the FIGs, multiple instances of the first horizontal member 247 and the second horizontal member 248 may be comprised in the support member 222.

Figure 6:
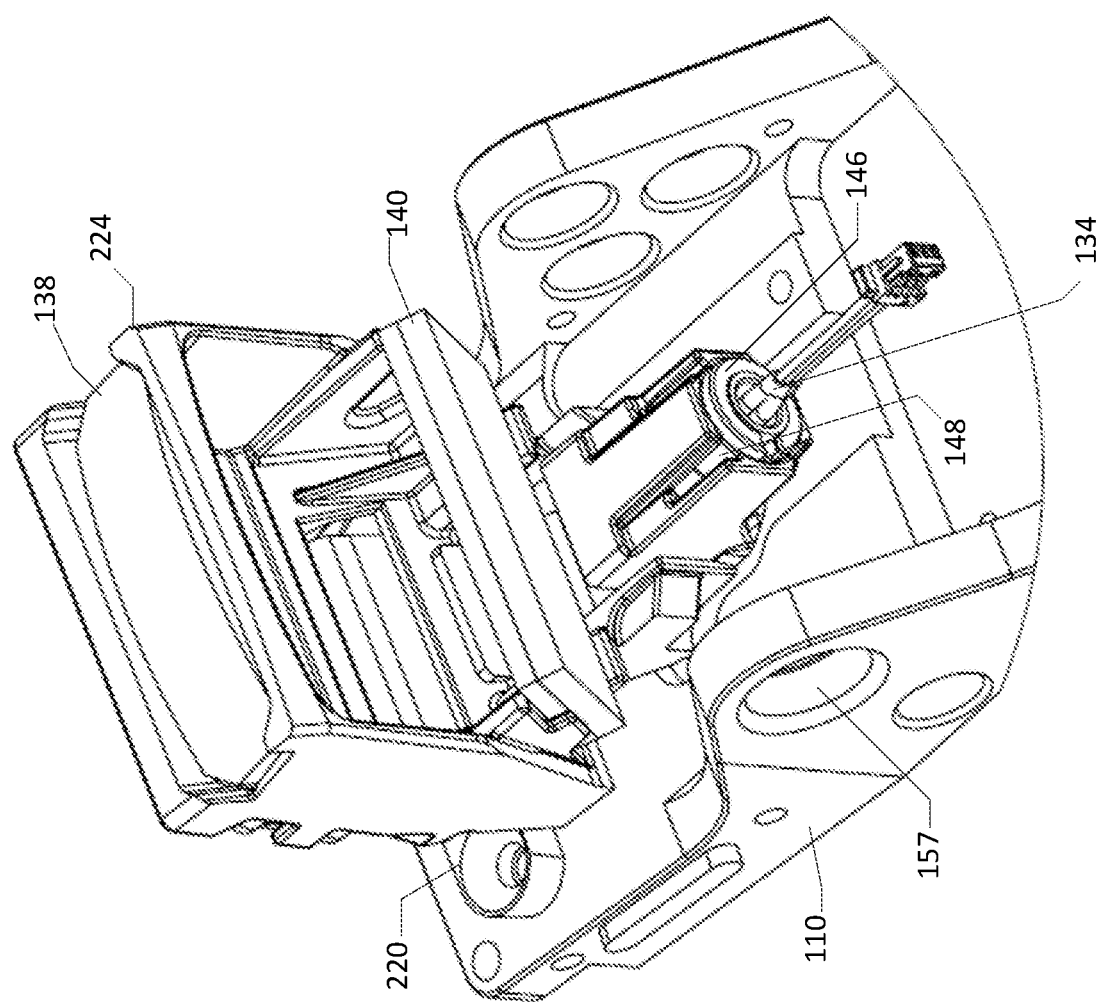
FIG. 6 is a perspective view of an example optical chassis attached to an example base and with optical components attached.

FIG. 6 depicts a perspective view of the example unitary optical component carrier 224 attached to the base 110 and with the optical components 134, 136, 138, 140, and 142 attached. The unitary optical component carrier 224 comprises a body that may serve as a bench or rack to which the optical components are attached. The unitary optical component carrier 224 may be integrally formed with the support member 222 which may be integrally formed with the attachment flange 220. The unitary optical component carrier 224 may comprise a rigid body and may be substantially resistant to changes in relative distances between the optical components. For example, in a scenario wherein forces are applied to the first receptacle 230 by elevation adjuster assembly 154 and/or by azimuth adjuster assembly 156, the unitary optical component carrier 224 may be resistant to distortion and may move substantially in unison with the relative distances between the optical components 134, 136, 138, 140, and 142 remaining substantially unchanged. The unitary optical component carrier 224 may be made from a material that has a relatively low coefficient of thermal expansion. As a result, the relative distance between the optical components may remain substantially the same over a wide spectrum of temperature environments. In an example, unitary optical component carrier 224 may be manufactured from titanium.

The unitary optical component carrier 224 may comprise a plurality of receptacles 230, 232, 234, 236, 238 configured to receive optical components. Each of the receptacles 230, 232, 234, 236, and 238 comprises one or more surfaces configured to receive corresponding surfaces of the appropriate optical components. The surface to surface mounting results in precise locating of the optical components relative to the unitary optical component carrier 224 and to each other. The receptacles 230, 232, 234, 236, and 238 are configured to allow the corresponding optical components to be applied from the exterior of the unitary optical component carrier 224. Mounting of the optical components from the exterior may be performed by an automated means such as, for example, by robotic handling. The optical components may be secured in the receptacles 230, 232, 234, 236, and 238 via friction between the optical components and the corresponding receptacle and/or by application of an adhesive.

Figure 7:
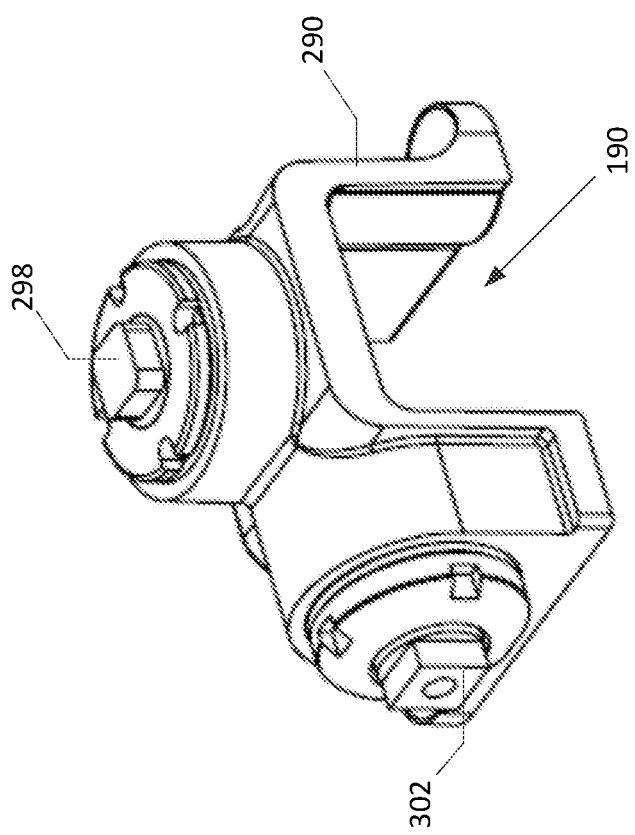
FIG. 7 is a perspective view of an example bridge.
Figure 8:
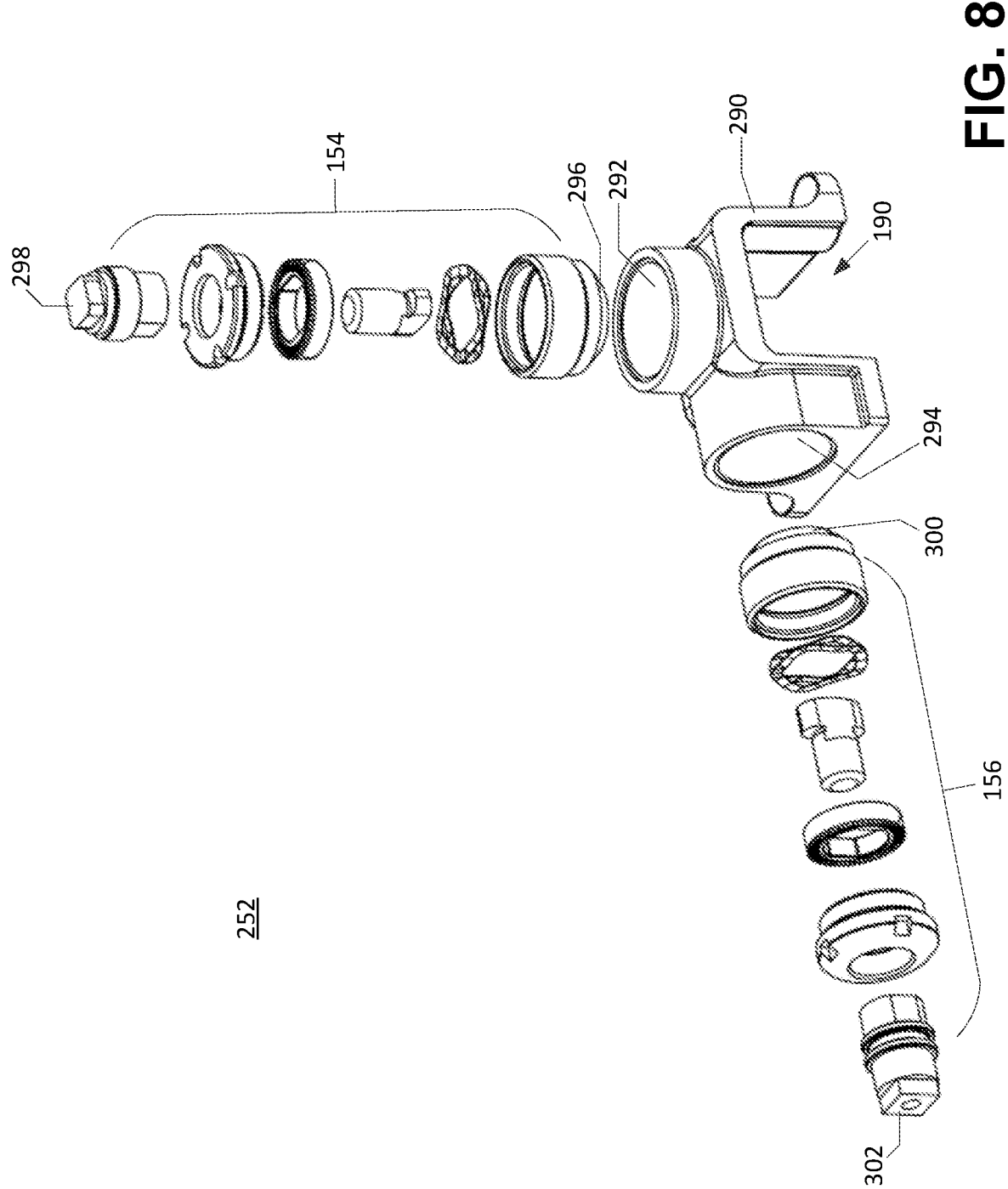
FIG. 8 is a perspective view of an example bridge with components exploded.
Figure 9:
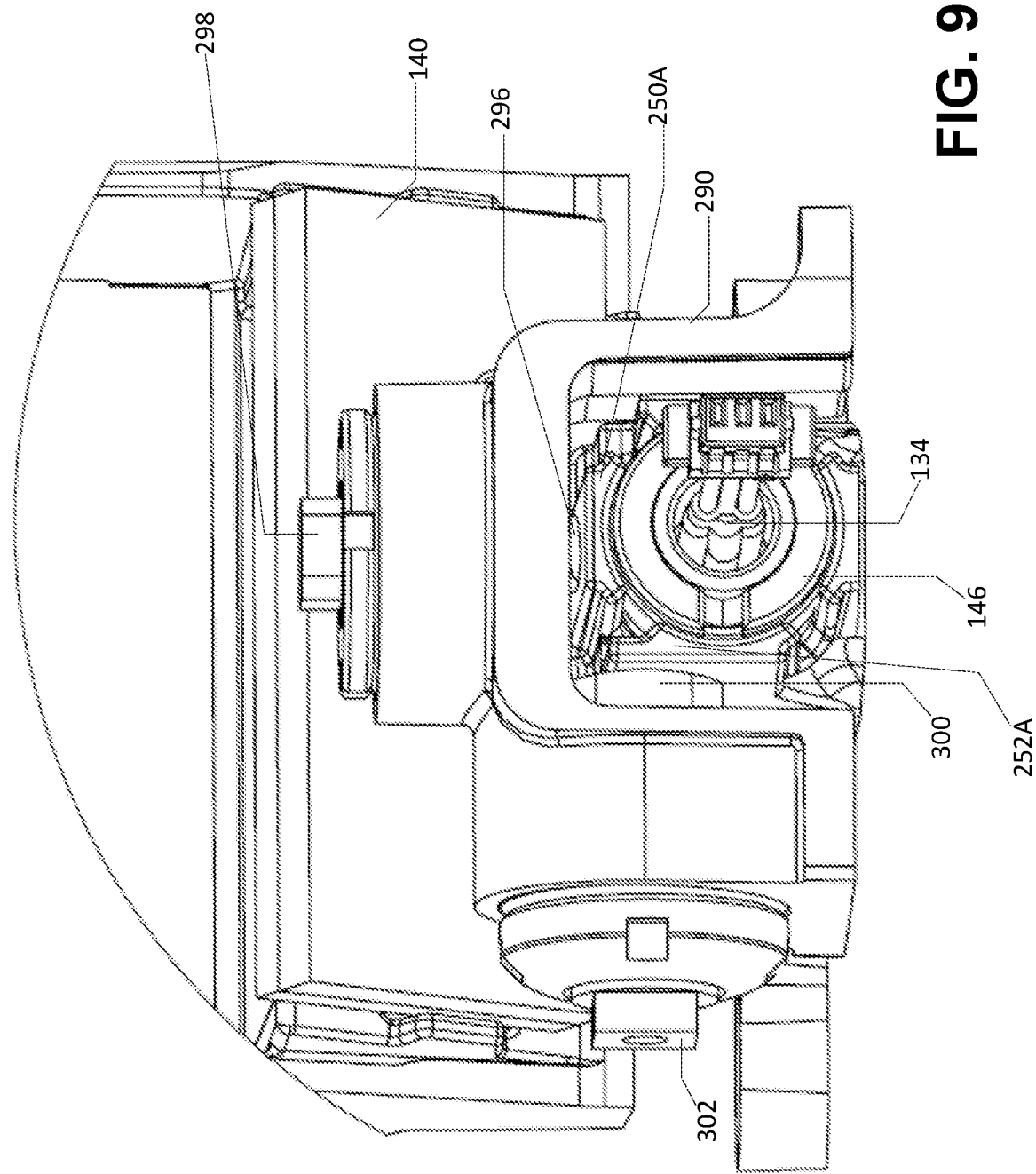
FIG. 9 is a perspective view of an example bridge applied to an example optical chassis.
Figure 10:
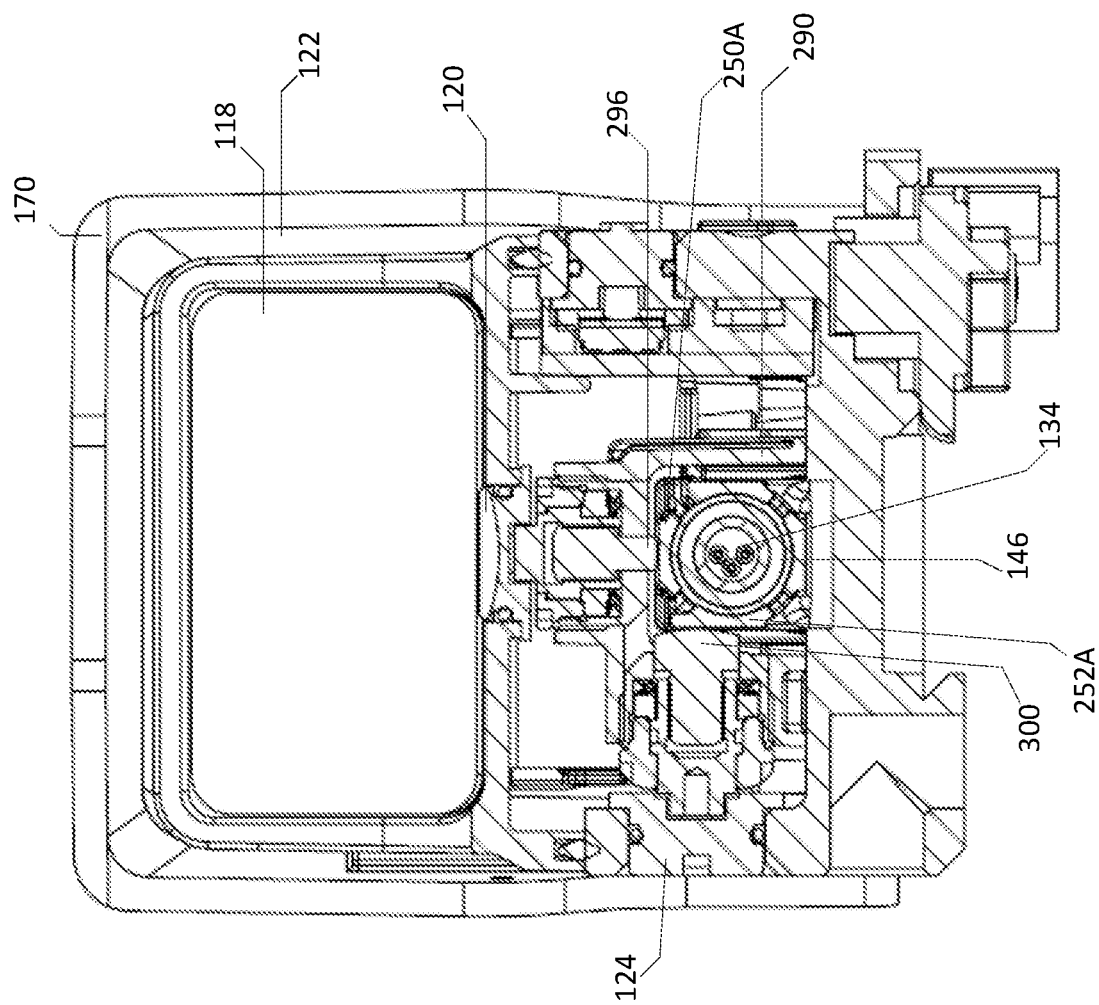
FIG. 10 is a sectional view of an example holographic sight.

FIG. 7 depicts a perspective view of the bridge 152. FIG. 8 depicts an exploded view of the bridge 152. FIG. 9 depicts an isolated perspective view of the bridge 152 engaged with the first receptacle 230 of the optical chassis 132. FIG. 10 depicts a front cross section view of the holographic sight 100 with the section taken through the bridge 152. The example bridge 152 may comprises a bridge body 290 which has openings 292 and 294 formed therein. The elevation adjuster assembly 154 may extend through the opening 292 into the opening 190 formed by the bridge 152 and the base 110. The azimuth adjuster assembly 156 may extend through the opening 294 into the opening 190 formed by the bridge 152 and the base 110.

The elevation adjuster assembly 154 may comprise a projection 296 and a head 298. The projection 296 of the elevation adjuster assembly 154 may extend into the opening 190 and abut an external surface 250A of the first receptacle 230 of unitary optical component carrier 224. Turning the head 298 in a first direction may cause the projection 296 to extend further into the opening 190. When the projection 296 is extended further into the opening, the projection 296 may increase the pressure or force applied on the external surface 250A of the first receptacle 230. The increase in pressure applied by the projection, in combination with the angular vertical range of movement allowed for by the support member 222, may result in the unitary optical component carrier 224 being angularly deflected or displaced in a downward or vertical direction relative to the attachment flange 220 and the base 110. Turning the head 298 in a second direction may cause the projection 296 to be retracted from the opening 190. When the projection 296 is retracted from the opening 190, the projection 296 decreases the pressure or force applied to the external surface 250A. The decrease in applied pressure, in combination with the angular vertical range of movement allowed for by the support member 222, may result in the unitary optical component carrier 224 being angularly displaced or deflected vertically upward relative to the attachment flange 220 and the base 110. The head 298 may coincide with an aperture 155 in the housing 122 allowing the elevation adjustment control 120, which may be knob, to access and interface with the head 298. The elevation adjustment control 120 may be rotationally coupled with the head 298. Turning the elevation adjustment control 120 may result in turning of the head 298 and the corresponding insertion and extraction of the projection 296 relative to the opening 190. The elevation adjustment control 120 may be axially decoupled from the head 298. Accordingly, axially movement of the elevation adjustment control 120 may not disturb or displace head 298 and the remainder of the bridge 152. For example, in response to the housing 122 expanding and/or contracting due to changes in temperature, the elevation adjustment control 120 may be displaced and may decouple from the head 298 and may not apply axial pressure to the head 298. The head 298, projection 296, bridge 290, and unitary optical component carrier are isolated from expansion and/or contraction of the housing 122 and/or azimuth adjustment control 124.

The azimuth adjuster assembly 156 may comprise a projection 300 and a head 302. The projection 300 of azimuth adjuster assembly 156 may extend into the opening 190 and abut an external surface 252A of the first receptacle 210 of the unitary optical component carrier 224. Turning the head 302 in a first direction may cause the projection 300 to extend further into the opening 190. When the projection 300 is extended further into the opening, the projection 300 may increase the pressure or force applied on the external surface 252A of the first receptacle 230. The increase in pressure applied by the projection, in combination with the angular horizontal range of movement allowed for by the support member 222, may result in the unitary optical component carrier 224 being angularly displaced or deflected in a horizontal direction relative to the attachment flange 220 and the base 110. Turning the head 302 in a second direction may cause the projection 300 to be retracted from the opening 190. When the projection 300 is retracted from the opening 190, the projection 302 decreases the pressure or force applied to the external surface 252A. The decrease in pressure, in combination with the angular horizontal range of movement allowed for by the support member 222, may result in the unitary optical component carrier 224 being angularly displaced or deflected horizontally relative to the attachment flange 220 and base 110. The head 302 may coincide with an aperture 157 in the base 110 allowing the azimuth adjustment control 124, which may be a knob, to access and interface with the head 302. The azimuth adjustment control 124 may be rotationally coupled with the head 302. Turning the azimuth adjustment control 124 may result in turning of the head 302 and the corresponding insertion and extraction of the projection 300 relative to the opening 190. The azimuth adjustment control 124 may be axially decoupled from the head 302. Accordingly, axially movement of the adjustment control 124 may not disturb or displace head 302 and the remainder of the bridge 152. For example, in response to the housing 122 expanding and/or contracting due to changes in temperature, the azimuth adjustment control 124 may be displaced and may decouple from the head 302 and may not apply pressure to the head 302. The head 302, projection 300, bridge 290, and unitary optical component carrier are isolated from expansion and/or contraction of the housing 122 and/or azimuth adjustment control 124.

The external surface of opposing side wall 250A and the external surface of opposing side wall 252A may be substantially flat or even surfaces. The projection 296 and the projection 300 may have substantially rounded ends that abut the corresponding surfaces of the side walls 250A and 252A. The rounded ends of the projections 296 and 300 on the substantially flat or even surfaces of the side walls 250A and 252A may allow for the first receptacle 230 and the remainder of the optical component carrier 224 to move freely in directions perpendicular to the projections 296 and 300. The projections 296 and 300 may slide on the surfaces of side walls 250A and 252 to accommodate relative movement, expansion, and contraction of the optical component carrier 224 and/or expansion and contraction of the bridge 290. The projections 296 and 300 do not impede the relative perpendicular movement of the optical component carrier 224.

Accordingly, Applicant has disclosed a holographic sight comprising a unitary optical component carrier. The unitary optical component carrier may comprise a first receptacle configured to receive a laser diode, a second receptacle configured to receive a mirror, a third receptacle configured to receive a collimating optic, a fourth receptacle configured to receive a grating, and a fifth receptacle configured to receive an image hologram. The unitary optical component carrier provides mechanical stability and maintains the relative positioning of the optical components applied to it.

Applicant has disclosed a holographic sight configured to isolate individual optical components from unintended external pressures and forces. The elevation control projection 296 and the azimuth control projection 300 may abut the unitary optical component carrier 224 and not the individual optical components. While the elevation control projection 296 and azimuth control projection 300 may angularly displace the unitary optical component carrier 224 in order to adjust the location of the hologram, the individual optical components maintain their intended positions relative to each other and thereby preserve the quality of the hologram. Further, the projections 296 and 300 may be rounded and abut substantially flat or even surfaces of the unitary optical component carrier 224. The unitary optical component carrier 224 is free to move (possibly due to relative expansion and/or contraction) relative to the projections 296 and 300. The elevation adjustment control 120 and the azimuth adjustment control 124 may be rotationally coupled with the heads 298 and 302, respectively, but may also axially decouple from the heads 298 and 302 when the elevation adjustment control 120 and azimuth adjustment control 124 are displaced. The elevation adjustment control 120 and azimuth adjustment control 124 may extend through openings 155 and 157 in the housing 122 and base 110 that are sufficiently large that movement, expansion, or contraction of the housing 122 and/or base 110 may not interfere with elevation adjustment control 120 and azimuth adjustment control 124. Accordingly, the elevation adjustment assembly 154, the azimuth adjustment assembly 156, the bridge 290, and unitary optical component carrier 224 may be mechanically isolated from expansion and contraction of the housing 122 and the base 110. The unitary optical component carrier 224 may maintain the optical components in precise relative position to each other even when external forces and displacements may be experienced in other portions of the holographic sight. The optical component carrier 224 may be decoupled or independent from unintended pressures or forces.

It will be appreciated that while illustrative embodiments have been disclosed, the scope of potential embodiments is not limited to those explicitly described. For example, while an example holographic sight is described with a particular number of optical components, different numbers of optical components may be comprised in a holographic sight consistent with the disclosure. Embodiments may have optical components arranged in formations other than as in the examples described herein. Likewise, embodiments may employ support members that provide similar functionality, but which are configured differently than as explicitly described herein. Further, while the bridge and adjustment assemblies are described with particular shapes and orientations, embodiments may employ bridges and assemblies with other shapes and orientations.

Although the features and elements may be described herein in particular combinations, each feature or element may be used alone, without the other features and elements, and/or in various combinations with or without other features and elements.

What is claimed:

1. A holographic sight comprising:
    a base;
    a unitary optical component carrier attached to the base, the unitary optical component carrier comprising a plurality of receptacles configured to receive optical components;
    a bridge attached to the base, the bridge forming an opening, a portion of the unitary optical component carrier extending within the opening; and
    a first projection coupled with the bridge and protruding from the bridge and into the opening, the first projection abutting the portion of the unitary optical component carrier.

2. The holographic sight of claim 1, further comprising:
    a head mechanically coupled to the first projection, rotation of the head in a first direction causing an increase in pressure applied by the first projection to the portion of the unitary optical component carrier.

3. The holographic sight of claim 2,
    wherein rotation of the head in a second direction causes a decrease in pressure applied by the first projection to the portion of the unitary optical component carrier.

4. The holographic sight of claim 3, further comprising:
    a support member coupled to the base and integrally formed with the unitary optical component carrier, the unitary optical component carrier extending from the support member and angularly movable in a vertical direction relative to the base,
    wherein rotation of the head in a first direction causing an increase in pressure applied by the first projection to the portion of the unitary optical component carrier causes the chassis to angularly move, with the support member as a fulcrum, in a vertical direction relative to the base, and
    wherein rotation of the head in a second direction causing a decrease in pressure applied by the first projection to the portion of the unitary optical component carrier causes the chassis to angularly move, with the support member as a fulcrum, in a vertical direction relative to the base.

5. The holographic sight of claim 3, further comprising:
    a support member coupled to the base and integrally formed with the unitary optical component carrier, the unitary optical component carrier extending from the support member and movable horizontally relative to the base,
    wherein rotation of the head in the first direction causing an increase in pressure applied by the first projection to the portion of the unitary optical component carrier causes the chassis to move horizontally relative to the base, and
    wherein rotation of the head in the second direction causing a decrease in pressure applied by the first projection to the portion of the unitary optical component carrier causes the chassis to move horizontally relative to the base.

6. The holographic sight of claim 1,
    wherein the portion of the unitary optical component carrier comprises a substantially even surface, and
    wherein the first projection comprises a rounded end, the rounded end abutting the substantially even surface of the portion of the unitary optical component carrier.

7. The holographic sight of claim 6,
    wherein the portion of the unitary optical component carrier is free to move relative to the first projection.

8. The holographic sight of claim 3, further comprising:
    a housing, the housing enveloping the unitary optical component carrier and the bridge, the housing having a first aperture formed therein,
    wherein the head is accessible via the first aperture.

9. The holographic sight of claim 8, further comprising:
    a knob mechanically interfacing with the head,
    wherein rotating the knob causes rotation of the head.

10. The holographic sight of claim 9, wherein the knob is axially decoupled from the head.

11. A holographic sight comprising:
    a base;
    a unitary optical component carrier attached to the base, the unitary optical component carrier comprising a plurality of receptacles configured to receive optical components;
    a bridge attached to the base, the bridge forming an opening, a portion of the unitary optical component carrier extending within the opening;
    a first projection coupled with the bridge and protruding from the bridge and into the opening, the first projection abutting the portion of the unitary optical component carrier; and
    a second projection coupled with the bridge and protruding from the bridge and into the opening, the second projection abutting the portion of the unitary optical component carrier.

12. The holographic sight of claim 11, further comprising
    a first head mechanically coupled to the first projection; and
    a second head mechanically coupled to the second projection,
    wherein the portion of the unitary optical component carrier comprises a first pair of opposing walls and a second pair of opposing walls, the first projection abutting one of the first pair of opposing walls and the second projection abutting one of the second pair of opposing walls, wherein rotation of the first head causes the first projection to extend further into the opening and increase pressure applied by the first projection to the one of the first pair of opposing walls, and wherein rotation of the second head causes the second projection to extend further into the opening and increase pressure applied by the second projection to the one of the second pair of opposing walls.

13. The holographic sight of claim 12, further comprising:

a support member coupled to the base and integrally formed with the unitary optical component carrier, the unitary optical component carrier extending from the support member and angularly movable relative to the base, wherein rotation of the first head causes the unitary optical component carrier to angularly move, with the support member as a fulcrum, in a vertical direction relative to the base, and wherein rotation of the second head causes the unitary optical component carrier to angularly move, with the support member as a fulcrum, in a horizontal direction relative to the base.

14. The holographic sight of claim 13, wherein the one of the first pair of walls comprises a substantially even surface and the first projection comprises a first rounded end, the first rounded end abutting the substantially even surface of the one of the first pair of walls, and wherein the one of the second pair of walls comprises a substantially even surface and the second projection comprises a second rounded end, the second rounded end abutting the substantially even surface of the one of the second pair of walls.

15. The holographic sight of claim 14, further comprising:

a housing, the housing enveloping the unitary optical carrier and the bridge, the housing having a first aperture formed therein, the base having a second aperture formed therein, wherein the first head is accessible via the first aperture and the second head is accessible via the second aperture.

16. The holographic sight of claim 15, a first knob mechanically interfacing with the first head and axially decoupled from the first head; and a second knob mechanically interfacing with the second head and axially decoupled from the second head.

17. A holographic sight comprising:

a base;

a bridge attached to the base, the bridge forming an opening;

a first projection coupled with the bridge and protruding from the bridge into the opening;

a first head mechanically coupled to the first projection, rotation of the first head causing the first projection to extend further into the opening;

a housing, the housing enveloping the bridge and having an aperture formed therein, the aperture aligning with the first head; and a knob mechanically interfacing with the first head, the knob axially decoupled from the first head.

18. The holographic sight of claim 17, wherein rotation of the knob causes the first head to rotate, rotation of the first head causing the first projection to extend further into the opening.

19. The holographic sight of claim 17, wherein in response to the housing expanding and contracting due to changes in temperature, the knob mechanically decouples from the first head.

20. The holographic sight of claim 17, further comprising:

a unitary optical component carrier attached to the base, a portion of the unitary optical component carrier received in the opening, the first projection abutting the portion of the unitary optical component carrier.

* * * * *